DOUBLE STUB TUNER

Filed Nov. 14, 1958

INVENTOR.
DONALD H. LANCTOT
BY *Elliott & Pastoriza*
ATTORNEYS

2,966,642
DOUBLE STUB TUNER

Donald H. Lanctot, Malibu, Calif., assignor to Don-Lan Electronics Co., Inc., a corporation of California Filed Nov. 14, 1958, Ser. No. 774,016
6 Claims. (Cl. 333—35)

This invention relates broadly to electrical tuners and more particularly to impedance matching stub type tuners for use in co-axial lines.

Tuning stubs for ultra high frequency transmission lines such as twin lead, co-axial lines, and wave guides are well known and find wide application in the art. For example, power transfer from a generating unit to an antenna can be readily optimized by insuring a proper impedance match between the output impedance of the power unit and the input impedance of the antenna. Such impedance matching or "tuning" of one unit with respect to the other for optimizing power transfer can be accomplished by active elements such as cathode followers in radio frequency applications or passive elements such as inductances, capacitances and resistances.

In the case of the transmission of ultra high frequencies in which the wave length of the energy is of the order of the dimensions of the transmission line itself, quarter wave length stubs are often employed. These stubs include shorting bars that are movable to vary the impedance in the matching device.

Heretofore, the provision of tuning stubs has increased the space requirements for high frequency installations. For example, to accommodate a fairly wide frequency range, a relatively long electrical length is required in the tuning stub requiring increased space and rendering physical design difficult. The situation is particularly awkward in the case of co-axial transmission lines since a far wider range of frequencies may be transmitted over these lines as compared, for example, to wave guides.

As a general rule, superior tuning may be achieved by employing a double stub construction wherein two shorting stubs are disposed in axially spaced relationship along the transmission line. These two stubs may be independently tuned to optimize energy transfer between the connected lines. The bulk, space utilization and awkward characteristics of conventional tuners are almost doubled when employing a double stub tuner. In the installation of electronic gear in missiles, it is extremely important to conserve weight and space and any system of miniaturizing any of the electrical components is a paramount consideration.

Bearing the foregoing in mind, it is a primary object of the present invention to provide a novel double stub tuner for co-axial transmission lines which is extremely compart and thus ideal for use in environments in which miniaturization is of importance.

Another important object is to provide a tuning device of the foregoing type which will enable tuning to be achieved over a relatively wide frequency range without increase in its external dimensions.

Still other important objects are to provide a double stub tuner which may be easily connected to co-axial lines, includes suitable indicating scales for reference during tuning, and which may be hermetically sealed by a simple cap structure for protecting the stub elements after a desired setting has been achieved.

These and many other objects and advantages of the present invention are attained by providing an annular insulative body carrying suitable connectors for connection to the co-axial lines between which the proper tuning or impedance match is desired. The insulative body includes an outer conducting member for connecting the outer conductors of the co-axial lines together and a center rod connecting to the inner conductors. The tuning elements include a pair of stub members axially spaced along the center rod and extending radially therefrom and then curving in parallel planes normal to the rod to follow circular paths about the insulative body. A pair of conducting rings in turn are mounted for movement about the insulative body and include short circuiting elements arranged to engage the circular stub portions.

By the foregoing annular construction for the stubs and conducting rings, a relatively large adjustment in stub length may be effected without the disadvantage of bulky projections from the co-axial line. Thus, the maximum lateral dimension of the tuner with respect to the direction of the co-axial line is comparable to the radial distance between the inner and outer conductors of the lines themselves and yet tuning stubs of much greater length can be provided as a consequence of their circumferential paths.

A simple annular cap can be positioned to surround the tuning portions of the device without appreciably increasing its overall dimensions. Thus, a sealed structure and protection against inadvertent moving of the tuning elements after a desired setting has been made is assured.

A better understanding of the preferred embodiment of the invention will be had by referring to the accompanying drawings, in which.

Figure 1:
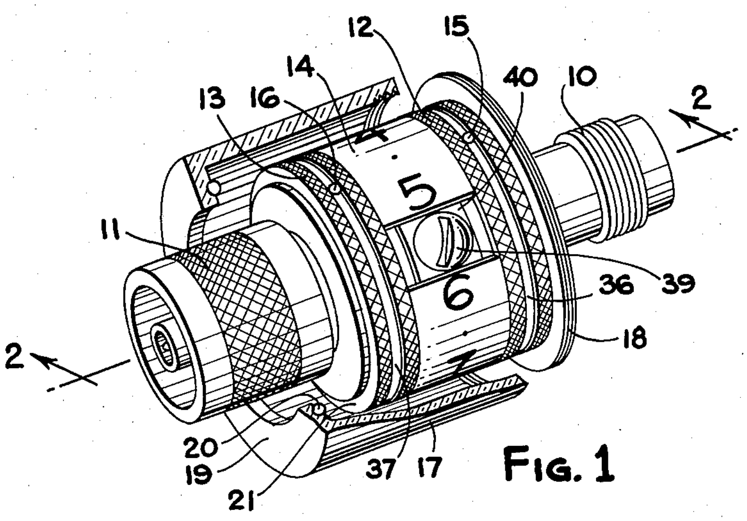
Figure 1 is an overall perspective view of the device showing a sealing cap partly cut away and separated therefrom.

Referring to Figure 1, the co-axial line tuner is shown as including a first co-axial connector 10 at one end and a second co-axial connector 11 at the other end. These connectors are provided for easy coupling to co-axial lines between which tuning or impedance matching is to take place. Between the connectors 10 and 11 there are illustrated annular tuning rings having knurled surfaces 12 and 13. These rings are spaced by a conducting annular band 14 provided with indicia such as the numerals 5, 6, and 7 as shown. The tuning conductor rings 12 and 13 themselves are rotatable with respect to the band 14 and include suitable markers such as 15 and 16 to indicate their relative position with respect to each other and the indicia on the band 14.

A sealing cap 17 may be readily threaded to a flanged member 18 forming part of the connector 10. This cap 17 includes a radially inwardly directed flange 19 provided with a sealing ring 20 for engagement with one flat annular face 21 of the device. Proper tuning may thus be effected by unthreading of the cap 17 and sliding it along the co-axial line connected to the connector 11. After tuning is finished, the cap may then be simply threaded onto the threaded flange 18, the sealing ring 20 insuring a tight seal to protect the tuning rings from dirt and dust and also prevent inadvertent movement thereof after a setting has been completed.

Figure 2:
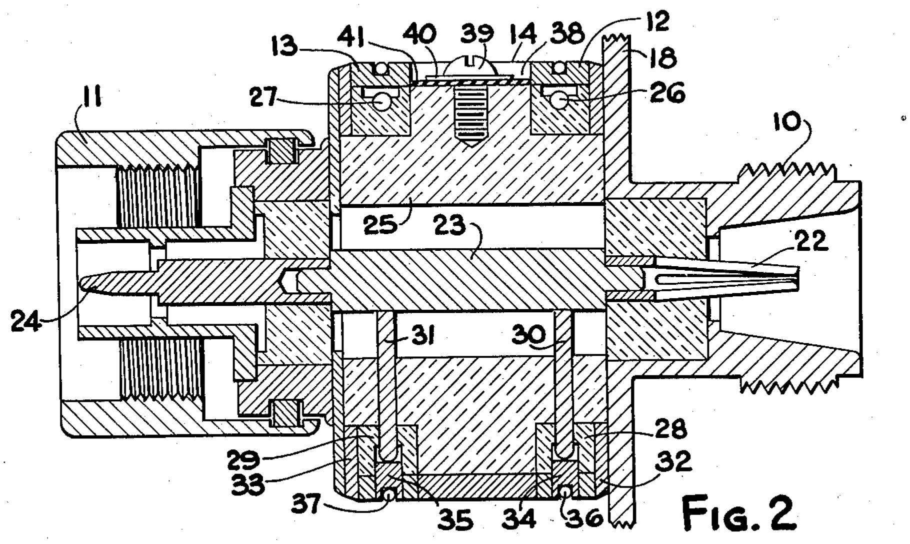
Figure 2 is an elevational cross section of the device taken in the direction of the arrows 2—2 of Figure 1; and, Figure 3 is a simplified schematic diagram illustrating an electrically equivalent circuit useful in explaining the operation of the device of Figures 1 and 2.

The manner in which actual impedance matching or tuning between the co-axial lines connected to the connectors 10 and 11 of the device of Figure 1 is accomplished will best be understood by referring to the detailed cross sectional view of Figure 2. As shown, the connector 10 includes an inner conductor 22 connecting to one end of a center rod 23. The other end of the center rod 23 connects to the inner conductor 24 for the connector 11. Annularly disposed about the center rod 23 is an insulative support body 25 about which the band 14 shown in Figure 1 is secured. Circular conducting stubs 26 and 27 in turn extend circumferentially within grooved insulative annular supporting members 28 and 29 about the insulative body 25 as shown. These annular conducting stubs extend radially inwardly as at 30 and 31 to connect to the center rod 23 at axially spaced points. The annular insulative support bodies 28 and 29 also provide guiding surfaces for the conducting rings 12 and 13. As shown in Figure 2, the rings 12 and 13 are in physical and electrical contact with the band 14 and also in electrical contact through spring washers 32 and 33, the end flange 18, and outer annular structure of the connector 11 to the outer conductors of any co-axial lines connected to the connectors 10 and 11.

As shown in the bottom of the cross section of Figure 2, the conducting rings 12 and 13 are arranged to be short circuited to the annular circular stubs 26 and 27 as by short circuiting bolts 34 and 35. These bolts include grooved heads for receiving retaining springs 36 and 37 biasing the bolts against the curved top surfaces of the stubs 26 and 27 within the grooved insulative supports. By this arrangement, the conducting rings 12 and 13 may be manually moved with respect to the insulative body and band 14 to various positions to move the shorting bolts 34 and 35 and vary their points of contact with the circular portions of the stubs 26 and 27.

Figure 3:
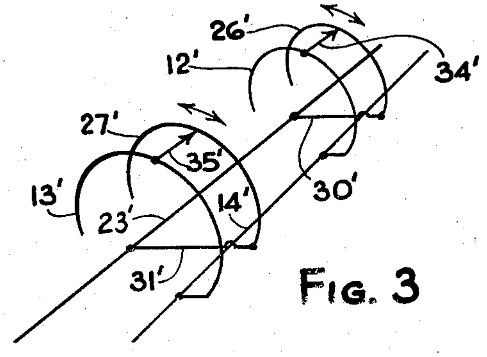

The foregoing operations can best be understood by referring to Figure 3 wherein the equivalent conducting portions to those in Figure 2 are illustrated by the identical numerals followed by a prime. In Figure 3 the center and outer conductors of the transmission line are shown at 23' and 14'. It will be evident from Figure 3 that the stubs 26' and 27' together with the conducting rings 12' and 13' and short circuiting bolts 34' and 35' constitute tuning stubs for the transmission line. Rotating the tuning rings 12' and 13' as indicated by the two headed arrows in Figure 3 essentially varies the electrical length between the short circuiting portion and the transmission line conductors 23' and 14' so that the desired electrical tuning can be achieved.

Moreover, it will be evident that a very wide range tuning can be achieved within a compact space as a consequence of the annular construction of the tuning stubs and tuning rings. The provision of the connectors 10 and 11 as shown and described facilitates connection of co-axial lines to the unit and thus the device may be easily manually installed by unskilled personnel.

It will be noted in Figure 3 that the tuning stubs 26' and 27' terminate prior to forming a complete circle. The tuning rings 12 and 13 and shorting stubs 34 and 35 may thus be rotated to an off position in which no short circuit is provided.

While the cap 17 will ordinarily prevent inadvertent movement of the tuning rings 12 and 13, it is desirable to provide a means for locking these rings in a set position. To this end, the band 14 may be provided with a channeled area 38 for accommodating a screw 39, washer 40, and expandable rubber pad 41. As shown best in Figure 2, the screw 39 threads into the insulative body 25.

After setting the rings 12 and 13, the screw 39 is tightened thereby forcing the washer 40 against the rubber pad 41 to cause the pad to expand against the edges of the tuning rings 12 and 13 and thereby tightly secure them in a set position.

While the device has been described as providing tuning between two co-axial lines connected to different units, it will be evident that the tuner could simply serve as a termination for a single co-axial line and provide a desired termination impedance by proper tuning of the stubs. In this event, one of the connectors could be replaced by a simple 50 ohm impedance.

While only one particular embodiment of the invention has been set forth, it will be understood that various modifications falling within the scope and spirit of the invention will readily occur to those skilled in the art. The double stub tuner is, therefore, not to be thought of as limited to the specific embodiments set forth and described.

What is claimed is:

1. A tuner for insertion in co-axial lines, comprising: a center conducting rod for connection at each end to the inner conductors respectively of said co-axial lines; an annular conducting member surrounding said center rod for connecting the outer conductors of said co-axial lines; at least one stub connected to said rod and extending radially therefrom, thence curving in a plane normal to said rod to follow a circular path at a constant radial distance from said rod inside said annular conducting member; and short circuiting means connecting said annular conducting member to a point on said stub, said short circuiting means being movable about said circular path to vary its effective electrical distance from said rod.

2. A double stub tuner for insertion between two co-axial lines comprising, in combination: an annular body of insulating material; a center conducting rod axially disposed within said body for connection at each end to the inner conductors of said two co-axial lines respectively; an outer conducting band secured about said body for electrically connecting the outer conductors of said two co-axial lines; a pair of axially spaced stubs connected to said center rod and extending radially therefrom, said stubs then curving in parallel circular paths about said body and terminating in free ends; a pair of conducting rings movable about said body respectively adjacent said stubs; and electrical short circuit means connected to said rings for engaging different points on said stubs as said rings are moved.

3. The subject matter of claim 2, in which said circular stubs are respectively concentrically positioned within respective ones of said conducting rings; a pair of insulative annularly grooved track members receiving said stubs within their grooved portions and serving as riding surfaces for said conducting rings, said short circuiting means constituting radially inwardly directed bolts having grooved heads, the ends of said bolts projecting into said grooves to engage said points on said stubs; and annular retaining springs passing about said conducting rings and seating in said grooved heads to bias said bolts radially inwardly.

4. The subject matter of claim 3, including scale markings on the outer surface of said band and reference points on said conducting rings marking the position of said bolts so that the relative positions of said bolts with respect to each other and said scale markings is observable; and an annular cover adapted to be telescoped over said insulative body and conducting rings to provide a sealed housing for said tuner.

5. The subject matter of claim 3, in which said band includes a channeled area; a pad of expandable material seated in said channeled area between peripheral portions of said conducting rings; and a screw passing through said pad and threading into said insulative body for expanding the edges of said pad against said peripheral portions of said rings to retain said rings in a set position.

6. A tuner for a coaxial transmission line comprising: a center conducting rod for connection to the inner conductor of said transmission line; an annular conducting member surrounding said center rod for connection to the outer conductor of said transmission line; means for holding said center conducting rod and annular conducting member in coaxial relationship; a stub connected to said rod and extending radially therefrom, thence curving in a plane normal to said rod to follow a circular path at a constant radial distance from said rod adjacent to said annular conducting member; and short circuiting means connecting said annular conducting member to a point on said stub, said short circuiting means being movable about said circular path to vary its effective electrical distance from said rod.

References Cited in the file of this patent

UNITED STATES PATENTS 2,421,137 Wheeler ---------------- May 27, 1947